Oct. 8, 1929.  J. F. HOGAN  1,730,657
CALENDERING METHOD AND APPARATUS
Filed May 23, 1928
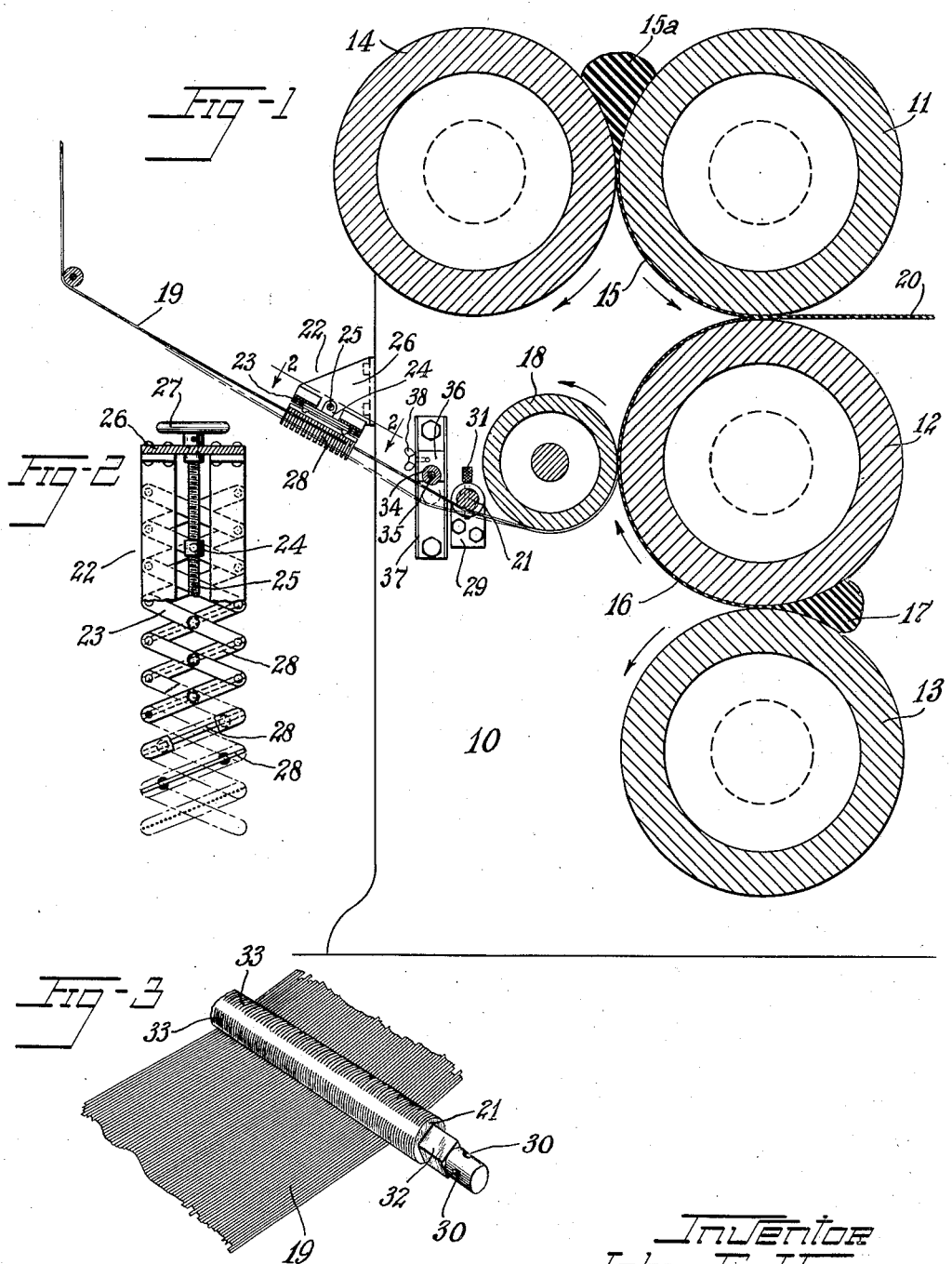

Patented Oct. 8, 1929

1,730,657

UNITED STATES PATENT OFFICE

JOHN F. HOGAN, OF AKRON, OHIO, ASSIGNOR TO THE B. F. GOODRICH COMPANY, OF NEW YORK, N. Y., A CORPORATION OF NEW YORK

CALENDERING METHOD AND APPARATUS

Application filed May 23, 1928. Serial No. 280,013.

This invention relates to the spacing and guiding of a series of parallel strands of material as in the production of weftless cord-tire fabric by calendering rubber onto a set of cords.

In the manufacture of fabrics of different characteristics the number of threads to the inch is varied by spreading or concentrating the strands of the series as they pass to the calender to receive the coating of rubber. The lateral movement of the strands, in a change of the spacing, is in each direction from the middle of the series, preferably, and since the distances successive strands require to be moved are cumulative the strands at the lateral margins of the series require to be set over a substantial distance even for a readjustment of but one strand to the inch.

The cord-guiding or spacing mechanism provided on the calender for guiding the series of strands to the calender rolls in properly spaced relation usually comprises an expanding comb for giving the cords an initial spacing, and a grooved spacing bar positioned nearer the calender rolls for giving the cords their final accurate spacing. The spacing bar is a rigid, generally round bar in which has been cut transverse grooves similar to screw threads of a pitch representing the number of threads to the inch desired in the finished product. The grooves are of short length so that several longitudinal series of grooves may be formed in a single bar, the spacing of the grooves corresponding to the several cord-spacings that it may be desired to utilize.

In changing the spacing of the cords the practice heretofore has been to stop the calender, adjust the expanding comb to effect the proper initial spacing of the cords, rotate the spacing bar until the cord-engaging grooves therein correspond with the comb spacing, and then start the calender. Since there was no way of causing the moving cords to fall naturally into their proper grooves in the spacing bar, it was necessary for the operator manually to perform this operation, a few cords at a time. The result was that a considerable interval elapsed before all the cords were properly positioned in parallel, equally spaced position in the grooves of the spacing bar. The coated fabric produced during this interval was considered defective and required to be scrapped so that each change of cord spacing resulted in substantial losses of material as well as in the operator's labor.

The chief objects of this invention are to provide an improved method and apparatus for spacing and guiding a set of cords, especially in manufacturing weftless cord fabric, whereby alterations in the spacing of the cords may be easily and quickly made and the production of defective material avoided. Other objects will be manifest in the following description.

Of the accompanying drawings:

Fig. 1 is a fragmentary vertical section through a calender embodying and adapted for the practice of my invention in its preferred form, and the work therein.

Fig. 2 is a section on line 2—2 of Fig. 1, with the work omitted.

Fig. 3 is a fragmentary perspective view of a spacing bar, and the work in operative association therewith.

Referring to the drawings, and first to Fig. 1, 10 is the end-frame of a rubber-working calender of the four-roll type having a vertical series of rolls 11, 12, and 13 and a fourth roll 14 offset laterally beside the top roll 11. A skim coat of plastic unvulcanized rubber 15 is formed on the roll 11 from a bank of stock 15$^a$ between the rolls 11, 14, and a similar coat of rubber 16 is formed on the roll 12 from a bank of stock 17 between the rolls 12, 13. A presser roll 18 positioned adjacent the roll 12 is adapted to press a continuous sheet or series of properly spaced cords 19 into the skim coat 16 on the roll 12 by which they are carried upward to the bight of the latter with the roll 11, where the skim coat 15 is forced onto the other side of the sheet to produce the sheet 20 of rubberized weftless cord fabric.

The cords 19 are arranged in properly spaced relation and under yielding tension are so guided into engagement with the under side of the presser roll 18 by means of a grooved bar 21 and an expanding comb 22 constituting spacer guides. The comb comprises a lazy tong 23 supported from each end by upstanding ears, such as the ear 24, which are threaded upon and suspended from the respective end portions of a right and left hand screw 25. The screw 25 is journaled in brackets such as the bracket 26 extending from the calender frame 10, and is provided with a hand-wheel 27 by which it is manually rotated to contract or expand the lazy tong 23. Respective multi-toothed combs 28, 28 are secured to the lowermost parallel links of the lazy tongs 23, and each cord of the series of cords 19 passes between the teeth of the combs, the latter being disposed at an angle to the travel of the cords so that their teeth are closely spaced laterally with relation to the cords but are sufficiently far apart from each other to permit knots in the cords to pass freely between them.

The spacing bar 21 (see Fig. 3) comprises a round steel bar extending from one side of the calender to the other, parallel to and closely adjacent the presser roll 18. Said bar is journaled in brackets such as the bracket 29 mounted upon the frame 10, and each of its trunnions is formed with recesses 30, 30 for respective detents such as the detent 31 which extends through the bracket 29 and into one of said recesses to hold the bar against rotation. The bar 21 is formed with square portions 32 adjoining its trunnions where it may be engaged by a wrench and rotated, upon occasion, when a change of cord-spacing is to be effected.

The bar 21 is formed with several longitudinal series of transversely disposed grooves 33, 33 equally spaced about its periphery, said grooves being similar to screw threads and of a spacing corresponding to the number of cords to the inch which may be required in the finished product. As herein shown, the bar is formed with four series of grooves which respectively may provide, for example, 23, 24, 26 and 27 grooves to the inch.

All the elements hereinbefore described, singly and in combination, are prior art, to which applicant makes no claim.

Positioned between the expanding comb 22 and the spacing bar 21, relatively close to and parallel with the latter, is a rotatable, elongated roller 34 which is journaled upon an axial rod 35, and the rod 35 has its ends mounted in respective slides such as the slide 36 mounted in a laterally flanged guide 37 on the frame 10 of the calender. Respective detents such as the detent 38 pass through suitable apertures in the guides 37 and into suitable complemental recesses in the slides 36 to hold the roller 34 normally above and out of contact with the cords 19, but to permit the roller to be lowered to a determinate position, upon occasion, when said cords are to be re-spaced.

In the operation of the invention, the cords of the cord-sheet 19 normally pass between the respective teeth of the expansible comb 22, thence pass to the spacing bar 21, where they are disposed in the adjacent grooves of a particular series of grooves therein, and then, passing under the presser roll 18, are pressed into the skim coat 16 on the calender roll 12 as hereinbefore described.

When it is desired to effect a change in the lateral spacing of the cords 19, the rotation of the calender rolls is stopped and the roller 34 is moved to its lower position to push the series of cords 19 out of the grooves 33 in the spacing bar 21, as indicated by the broken lines of Fig. 1, without removing the cords from between the teeth of the adjustable comb 22. The detents 31 are then removed, the spacing bar 21 is rotated to bring the desired series of grooves 33 into position where they subsequently will be engaged by the cords 19, and said detents replaced to lock the bar in position. The handwheel 27 is then turned to expand or contract the lazy tong 23 as desired and thereby to change the lateral position and augularity of the combs 28 to effect the desired re-spacing of the cords 19. The rotation of the calender rolls is then resumed.

Although the re-spacing of the cords 19 by the comb 22 results in the cords assuming an oblique diverging or converging position as compared with their normal parallel position, between the comb 22 and the presser roll 18, they quickly resume their normal parallel position after the calender is started because of their natural tendency to traverse the distance between comb and presser roll by the shortest path, the rotation of the roller 34 and of the rolls 12 and 18 with the cords embedded in the rubber between the two causing the cords to shift in an orderly manner on the roll 18 until they are approximately at right angles thereto. The roller 34 is then lifted from the sheet of cords 19 and secured in its raised position, permitting said cords to be drawn upward and again to come into engagement with the spacing bar 21. Since the cords already are in parallel relation practically all of them fall into the proper grooves 31 in the bar so that but little manual effort is required to cause the remainder to do so.

The re-spacing of the cords is accomplished with little effort and in a relatively brief interval of time, so that but little defective material, due either to improperly spaced cords or cords which cross each other, is produced.

My invention is susceptible of various modifications and I do not limit my claims to the specific construction or exact procedure described.

I claim:

1. In calendering apparatus, the combination of a calender, a spacer guide for guiding a multiplicity of cords in parallelism thereinto, and means for concurrently disengaging the cords from the spacer guide and holding them out of association therewith to effect a lateral shifting of the cords for re-association therewith.

2. Calendering apparatus as defined in claim 1 in which the disengaging means comprises a roller disposed transversely to the path of the cords and movable to force the cords out of association with the spacer guide.

3. In calendering apparatus, the combination of a calender, a grooved bar for guiding a multiplicity of cords in parallelism thereinto, and means for disengaging the set of cords from the grooves of said bar and holding them out of engagement therewith to effect a lateral shifting of the cords for re-association therewith.

4. In calendering apparatus, the combination of a calender, guiding means for directing a multiplicity of cords in parallelism thereinto, said guiding means comprising a transversely grooved bar past which said cords pass while disposed in respective grooves therein, and a smooth surfaced bar movable into contact with the cords adjacent said grooved bar to remove them from said grooves.

In witness whereof I have hereunto set my hand this 17th day of May, 1928.

JOHN F. HOGAN.